US011066087B2

(12) United States Patent
Yano et al.

(10) Patent No.: US 11,066,087 B2
(45) Date of Patent: Jul. 20, 2021

(54) MAINTENANCE ASSISTANCE SYSTEM AND MAINTENANCE ASSISTANCE METHOD FOR RAILROAD GROUND EQUIPMENT

(71) Applicant: Hitachi, Ltd., Tokyo (JP)

(72) Inventors: Kojin Yano, Tokyo (JP); Tomohito Takai, Tokyo (JP); Toshihiro Eguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/677,787

(22) Filed: Nov. 8, 2019

(65) Prior Publication Data
US 2020/0070861 A1  Mar. 5, 2020

Related U.S. Application Data

(62) Division of application No. 15/080,837, filed on Mar. 25, 2016, now abandoned.

(30) Foreign Application Priority Data

Apr. 28, 2015 (JP) .................. 2015-091477

(51) Int. Cl.
*B61L 27/00* (2006.01)
*G06Q 50/30* (2012.01)
(Continued)

(52) U.S. Cl.
CPC ......... *B61L 27/0083* (2013.01); *B61L 23/045* (2013.01); *B61L 25/06* (2013.01); *G06Q 10/20* (2013.01); *G06Q 50/30* (2013.01)

(58) Field of Classification Search
CPC .... B61L 23/045; B61L 25/06; B61L 27/0083; G06Q 10/20; G06Q 50/30
See application file for complete search history.

(56) References Cited

U.S. PATENT DOCUMENTS

2006/0195327 A1* 8/2006 Kumar ................ G06Q 10/087
  705/28
2007/0152107 A1* 7/2007 LeFebvre ............ B61L 25/025
  246/169 R
(Continued)

FOREIGN PATENT DOCUMENTS

JP   2007-263923 A   10/2007
JP   2007-276626 A   10/2007
(Continued)

OTHER PUBLICATIONS

Communication Pursuant to Article 94(3) EPC received in corresponding European Application No. 16 162 222.0 dated Apr. 13, 2018.
(Continued)

*Primary Examiner* — Mohammed Shamsuzzaman
(74) *Attorney, Agent, or Firm* — Mattingly & Malur, PC

(57) ABSTRACT

An object is to improve the accuracy of prediction of deterioration of railroad ground equipment. Provided is a maintenance assistance system for railroad ground equipment, comprising: an environmental-information storage part storing environmental information containing information on weather observed at a plurality of geographical points and on geographical conditions at the geographical points; and an environmental-load estimation part holding a relational formula indicating the relationship between aged deterioration of railroad ground equipment and the environmental information, and configured to, upon specification of railroad ground equipment for which to execute deterioration prediction, acquire the environmental information which is recorded at a point near the installed position of the railroad ground equipment, during the target period of the deterioration prediction, and predict the degree of aged deterioration of the railroad ground equipment by using the
(Continued)

acquired environmental information and the relational formula.

14 Claims, 20 Drawing Sheets

(51) Int. Cl.
*G06Q 10/00* (2012.01)
*B61L 23/04* (2006.01)
*B61L 25/06* (2006.01)

(56) References Cited

U.S. PATENT DOCUMENTS

| | | | |
|---|---|---|---|
| 2012/0310548 A1* | 12/2012 | Takahashi | G06F 3/04842 702/24 |
| 2013/0344802 A1* | 12/2013 | Armour | H04W 84/005 455/39 |
| 2015/0005994 A1* | 1/2015 | Kumar | B61L 27/0027 701/20 |
| 2016/0009304 A1* | 1/2016 | Kumar | B61L 27/0077 701/19 |
| 2016/0078695 A1* | 3/2016 | McClintic | G07C 5/0816 701/29.4 |

FOREIGN PATENT DOCUMENTS

| | | |
|---|---|---|
| JP | 2008-292291 A | 12/2008 |
| JP | 2010-97392 A | 4/2010 |
| JP | 2012-251846 A | 12/2012 |
| WO | 2006/088763 A2 | 8/2006 |
| WO | 2014/110099 A2 | 7/2014 |

OTHER PUBLICATIONS

Japanese Office Action received in corresponding Japanese Application No. 2015-91477 dated Jul. 17, 2018.
Singaporean Office Action received in corresponding Singaporean Application No. 10201602370S dated Oct. 5, 2018.

* cited by examiner

EXAMPLE OF CONFIGURATION OF INSPECTION INFORMATION TABLE 112

| EQUIPMENT ID (201) | TYPE ID (202) | LINE SECTION ID (203) | KILOMETRAGE (204) | INSPECTION DATE (205) | INSPECTION VALUE (206) |
|---|---|---|---|---|---|
| F01 | CROSSING BARRIER | L01 | 1.2 | 2010/1/1 | 1.5 |
| F01 | CROSSING BARRIER | L01 | 1.2 | 2010/1/5 | 1.6 |
| F02 | TRACK | L01 | 1.9 | 2010/2/9 | 1.9 |
| .. | | | | | .. |

FIG. 3

EXAMPLE OF CONFIGURATION OF ENVIRONMENTAL INFORMATION TABLE 113

| GEOGRAPHICAL POINT ID 301 | GEOGRAPHICAL POINT 302 | ALTITUDE 303 | DATE 304 | WEATHER 305 | HIGHEST TEMPERATURE 306 | LOWEST TEMPERATURE 307 | AMOUNT OF RAINFALL /SNOWFALL 308 | AMOUNT OF SOLAR RADIATION 309 |
|---|---|---|---|---|---|---|---|---|
| L01 | EAST LONGITUDE 135.2 NORTH LATITUDE 36.7 | 100m | 2012/5/3 | FINE | 19.1 | 10.5 | 0 | 2.0 |
| L01 | EAST LONGITUDE 135.2 NORTH LATITUDE 36.7 | 105m | 2012/5/4 | RAIN | 23.6 | 16.5 | RAIN 120mm | 0.0 |
| L02 | EAST LONGITUDE 135.0 NORTH LATITUDE 35.8 | 95m | 2012/5/4 | RAIN | 22.4 | 17.3 | RAIN 115mm | 0.0 |
| : | : | | | | : | | | |

FIG. 4

EXAMPLE OF CONFIGURATION OF CONVERSION INFORMATION TABLE 117

| LINE SECTION ID (1801) | KILOMETRAGE (1802) | POSITION (1803) |
|---|---|---|
| L01 | 1.0 | EAST LONGITUDE 139.992 NORTH LATITUDE 35.563 |
| L01 | 1.2 | EAST LONGITUDE 139.992 NORTH LATITUDE 35.564 |
| L01 | 1.3 | EAST LONGITUDE 139.992 NORTH LATITUDE 35.565 |
| L01 | 1.5 | EAST LONGITUDE 139.991 NORTH LATITUDE 35.565 |
| L01 | 1.6 | EAST LONGITUDE 139.991 NORTH LATITUDE 35.565 |
| L01 | 1.9 | EAST LONGITUDE 139.991 NORTH LATITUDE 35.564 |
| L01 | 2.2 | EAST LONGITUDE 139.990 NORTH LATITUDE 35.565 |
| L01 | 2.3 | EAST LONGITUDE 139.990 NORTH LATITUDE 35.565 |
| L01 | 2.6 | EAST LONGITUDE 139.988 NORTH LATITUDE 35.564 |
| : | : | : |

FIG. 5

EXAMPLE OF CONFIGURATION OF
SETTING INFORMATION DATA 110

| PREDICTION PERIOD | TARGET EQUIPMENT ID | TIME INTERVAL |
|---|---|---|
| 2012/1/1 ~ 2020/12/31 | F01,F02,F05 | 1hr |

EXAMPLE OF CONFIGURATION OF TRANSPORTATION INFORMATION TABLE 603

| TRAIN ID | LINE SECTION ID | INTER-STATION AREA ID | DATE | TIME | KILOMETRAGE | SPEED | ACCELERATION/ DECELERATION RATE | AMOUNT OF TRANSPORTATION |
|---|---|---|---|---|---|---|---|---|
| T001 | L01 | B02 | 2011/10/5 | 16:00:00 | 10.5 | 40.5 | +0.2 | 126 |
| T001 | L01 | B02 | 2011/10/5 | 16:01:00 | 10.7 | 50.1 | +0.1 | 154 |
| T001 | L02 | B03 | 2011/10/5 | 16:10:15 | 14.3 | 30.2 | −0.1 | 123 |
| ‥ | ‥ | | | | | | | |

FIG. 9

EXAMPLE OF CONFIGURATION OF
OPERATION INFORMATION TABLE 1103

| LINE SECTION ID 1601 | KILOMETRAGE (AREA) 1602 | DATE 1603 | TIME 1604 | CONTENT OF OPERATION 1605 |
|---|---|---|---|---|
| L01 | 10.5 ~ 10.8 | 2011/12/5 | 16:00:00 | SPRAYING ANTI-FREEZE AGENT 200g/m^2 |
| L01 | 12.3 ~ 15.5 | 2011/12/5 | 16:01:00 | SPRAYING ANTI-FREEZE AGENT 200g/m^2 |
| L01 | 14.3 ~ 19.2 | 2011/12/5 | 16:10:15 | SPRAYING ANTI-FREEZE AGENT 100g/m^2 |
| .. | .. | .. | .. | .. |

FIG. 15

EXAMPLE OF CONFIGURATION OF
NEARBY-EQUIPMENT-INFORMATION TABLE 1304

| EQUIPMENT ID | LINE SECTION ID | INSTALLATION KILOMETRAGE | TYPE ID |
|---|---|---|---|
| F01 | L01 | 6.5 | SIGNAL |
| F02 | L01 | 6.5 | CROSSING BARRIER |
| F03 | L01 | 11.2 ~ 11.3 | TRACK |
| F04 | L01 | 11.2 ~ 11.5 | MESSENGER WIRE |
| F05 | L02 | 15.5 | SIGNAL |
| : | : | : | : |

FIG. 18

EXAMPLE OF CONFIGURATION OF
ENVIRONMENTAL−DETERIORATION−MODEL TABLE 1308

| MODEL ID | TYPE ID | EXPLANATORY VARIABLE | FUNCTION FORM |
|---|---|---|---|
| M01 | OVERHEAD WIRE | WIND SPEED, TEMPERATURE DIFFERENCE | DETERIORATION = $\Sigma$ WIND SPEED × TEMPERATURE DIFFERENCE |
| M02 | TRACK | TEMPERATURE DIFFERENCE | DETERIORATION = $\Sigma$ TEMPERATURE DIFFERENCE |
| M03 | CROSSING BARRIER | | |
| M04 | | | |
| M05 | | | |
| .. | | .. | .. |

MAINTENANCE ASSISTANCE SYSTEM AND MAINTENANCE ASSISTANCE METHOD FOR RAILROAD GROUND EQUIPMENT

CROSS-REFERENCE TO RELATED APPLICATIONS

The present application claims a priority from Japanese Patent Application No. 2015-91477 filed on Apr. 28, 2015, the content of which herein incorporated by reference.

BACKGROUND OF THE INVENTION

1. Field of the Invention

The present invention relates to a maintenance assistance system and a maintenance assistance method for railroad ground equipment.

2. Related Art

Maintenance assistance systems for railroad ground equipment are systems that assist maintenance work such as monitoring, inspection, and replacement of ground equipment for smooth railroad operation. There are various types of railroad ground equipment. For example, signal-related railroad ground equipment includes signals, switch machines, alarms, crossing barriers, and the like, track-related railroad ground equipment includes rails, crossties, point blades, and the like, and power-related railroad ground equipment includes feeders, trolley wires, and the like. Such equipment has heretofore been maintained basically via operation involving replacing the equipment after the elapse of a certain length of time (time-based maintenance). In recent years, however, the maintenance method has been changing to operation involving constantly monitoring the condition of equipment and replacing the equipment when its condition exceeds or is predicted to exceed a certain reference level (condition-based maintenance).

In this regard, Japanese Patent Application Laid-open Publication No. 2007-263923, for example, describes a technique of predicting the corrosion of a metal fitting for a power transmission cable of a power company, or more specifically of predicting the remaining life of the metal fitting by estimating the rate of the corrosion thereof based on topographic information such as the altitude and the distance to seashore and environmental information such as the amount of time the metal fitting stays wet.

However, the technique described in the above publication is a corrosion prediction method designed for a metal fitting for a power transmission cable, without consideration of how to apply the method to the field of railroad. In particular, the above publication does not involve anything for prediction of the deterioration of railroad ground equipment. Besides the installation environment, the conditions of train travel around the equipment installation location are also considered to influence the deterioration of railroad ground equipment similarly. However, the above publication does not consider such perspective at all, and still has a problem.

SUMMARY OF THE INVENTION

The present invention has been made to solve the above and other problems, and an object thereof is to provide a maintenance assistance system, and a maintenance assistance method for railroad ground equipment capable of properly predicting the deterioration of maintenance-target railroad ground equipment with the influence of the installation environment of the equipment and the like taken into account.

To solve the above problems, an aspect of the present invention provides a maintenance assistance system for railroad ground equipment, comprising: an environmental-information storage part storing environmental information containing information on weather observed at a plurality of geographical points and on geographical conditions at the geographical points; and an environmental-load estimation part holding a relational formula indicating a relationship between aged deterioration of railroad ground equipment and the environmental information, and configured to, upon specification of railroad ground equipment for which to execute deterioration prediction, acquire the environmental information which is recorded at a point near an installed position of the railroad ground equipment, during a target period of the deterioration prediction, and predict a degree of aged deterioration of the railroad ground equipment by using the acquired environmental information and the relational formula.

According to the present invention, the deterioration of maintenance-target railroad ground equipment can be properly predicted with the influence of the installation environment of the equipment and the like taken into account.

BRIEF DESCRIPTION OF THE DRAWINGS

FIG. 3 shows an example of the configuration of an inspection information table 112;

FIG. 4 shows an example of the configuration of an environmental information table 113;

FIG. 5 shows an example of the configuration of a conversion information table 117;

FIG. 9 shows an example of the configuration of a transportation information table 603;

FIG. 15 shows an example of the configuration of an operation information table 1103;

FIG. 18 shows an example of the configuration of a nearby-equipment-information table 1304;

FIG. 19 shows an example of the configuration of an environmental-deterioration-model table 1308.

DETAILED DESCRIPTION OF THE INVENTION

Figure 1:
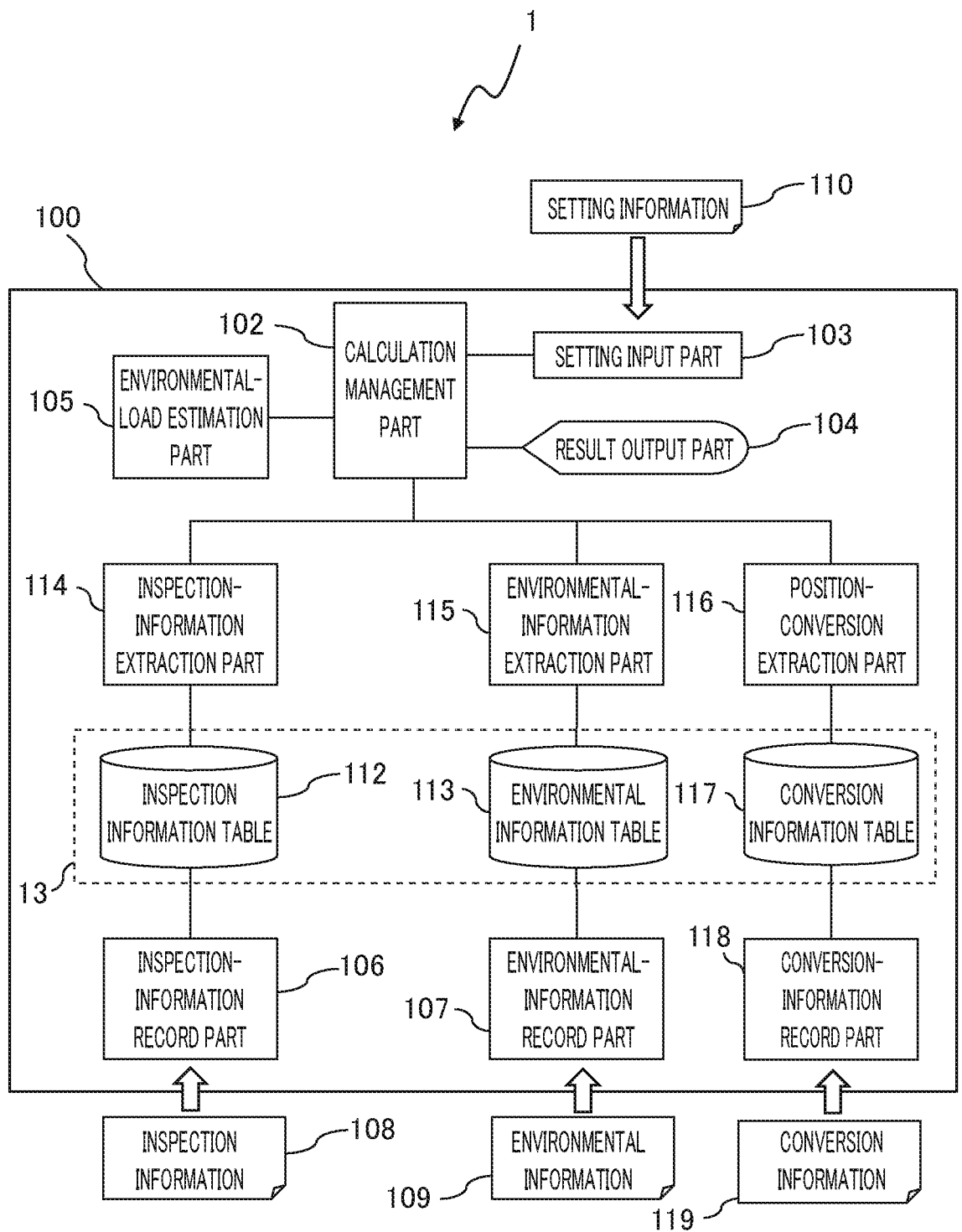
FIG. 1 is a diagram showing an example of the configuration of a maintenance assistance system for railroad ground equipment according to an embodiment of the present invention.

The present invention will be described below through embodiments thereof with reference to the drawings. In the following description, parts and units denoted by identical reference numerals represent identical elements, and their basic configurations and operation are similar.

First Embodiment

A first embodiment of the present invention will be described first. This embodiment predicts the deterioration of maintenance-target railroad ground equipment based on information on the environment around the ground equipment, for the purpose of assisting a maintenance plan for the ground equipment and the like.

Figure 2:
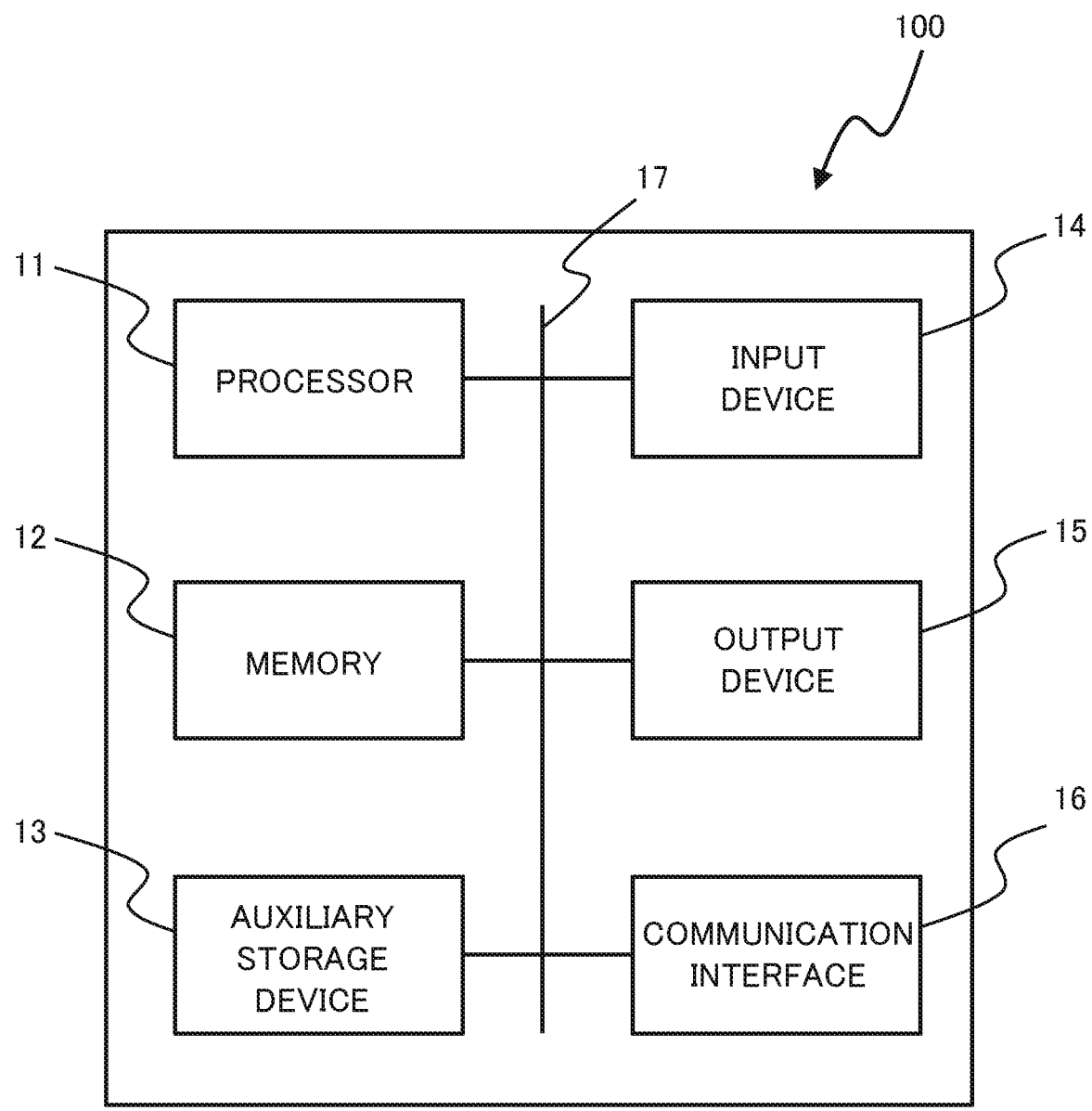
FIG. 2 is a diagram showing an example of the hardware configuration of the system in FIG. 1.

FIG. 1 is a block diagram showing an example of the configuration of a maintenance assistance system 1 for railroad ground equipment according to this embodiment. The maintenance assistance system 1 includes a maintenance assistance apparatus 100 which is a computer having a hardware configuration exemplarily shown in FIG. 2, for example. In FIG. 2, the maintenance assistance apparatus 100 includes information processing resources such as: a processor 11 such as a CPU; a memory (primary storage device) 12 including a RAM, a ROM, and the like; an auxiliary storage device 13 including a hard disk drive (HDD), a solid state drive (SSD), or the like; an input device 14 including a keyboard, a mouse, a touchscreen, and the like; an output device 15 including a liquid crystal display, a printer, and the like; a communication interface 16 which is an interface circuit enabling coupling to other apparatuses via a communication line such as a local area network (LAN); and a bus 17 coupling these elements to each other.

Data with which the maintenance assistance apparatus 100 executes a deterioration prediction process may be inputted via the input device 14 or forwarded from an external apparatus via the communication interface 16. In this embodiment, several types of data to be described later, e.g. inspection information data 108, environmental information data 109, and setting information data 110 for defining the operation of calculation management part 102 are inputted through a terminal apparatus coupled to the communication interface 16.

The processor 11 functions as a computation device configured to execute a simulation process of this embodiment in accordance with a program stored in the memory 12. As shown in FIG. 1, the memory 12 stores one or more computer programs for implementing an inspection-information record part 106, an environmental-information record part 107, and a conversion-information record part 118 configured to record externally inputted information into the auxiliary storage device 13, a setting input part 103 configured to receive the setting information data 110 for defining the operation of the calculation management part 102, an inspection-information extraction part 114 configured to extract information necessary for program execution from the auxiliary storage device 13, an environmental-information extraction part 115, a position-conversion extraction part 116, an environmental-load estimation part 105 configured to execute a calculation process, and a calculation management part 102 configured to manage the execution of the calculation process. Here, when the processor 11 implements the calculation management part 102, which is stored in the memory 12, each program stored in the memory 12 can be called as appropriate, and the function given to each part (function as a program) can be exerted.

Next, the function of each program will be described with reference to FIG. 1. The inspection-information record part 106 has a function to record the inspection information data 108 into the auxiliary storage device 13 as an inspection information table 112 upon input of the inspection information data 108 from the terminal apparatus. Similarly, the environmental-information record part 107 has a function to record the environmental information data 109 into the auxiliary storage device 13 as an environmental information table 113 upon input of the environmental information data 109 from the terminal apparatus, and the conversion-information record part 118 has a function to record the conversion information data 119 into the auxiliary storage device 13 as a conversion information table 117 upon input of the conversion information data 119 from the terminal apparatus. Note that the inspection information data 108, for example, will be simply referred to as the inspection information for simplicity. The same applies to each type of information used to execute the processes in this embodiment and other embodiments to be described later.

The inspection-information extraction part 114 has a function to search the inspection information table 112 in response to an instruction from the calculation management part 102 and extract corresponding inspection information 108 therefrom. Similarly, the environmental-information extraction part 115 has a function to search the environmental information table 113 in response to an instruction from the calculation management part 102 and extract corresponding environmental information 109 therefrom, and the position-conversion extraction part 116 has a function to search the conversion information table 117 in response to an instruction from the calculation management part 102 and extract corresponding conversion information 119 therefrom.

The environmental-load estimation part 105 has a function to estimate the degree of progression of deterioration due to the environment of the equipment of interest based on the inspection information 108 on the equipment and the information on the environment around the equipment. In a case where the position of the equipment is managed in terms of kilometrage in the railroad line section to which the equipment belongs (the distance from the start of the railroad line section), the positional information is converted by referring to the conversion information table 117 to be described later, and environmental information acquired at a point near the equipment is utilized.

Figure 7:
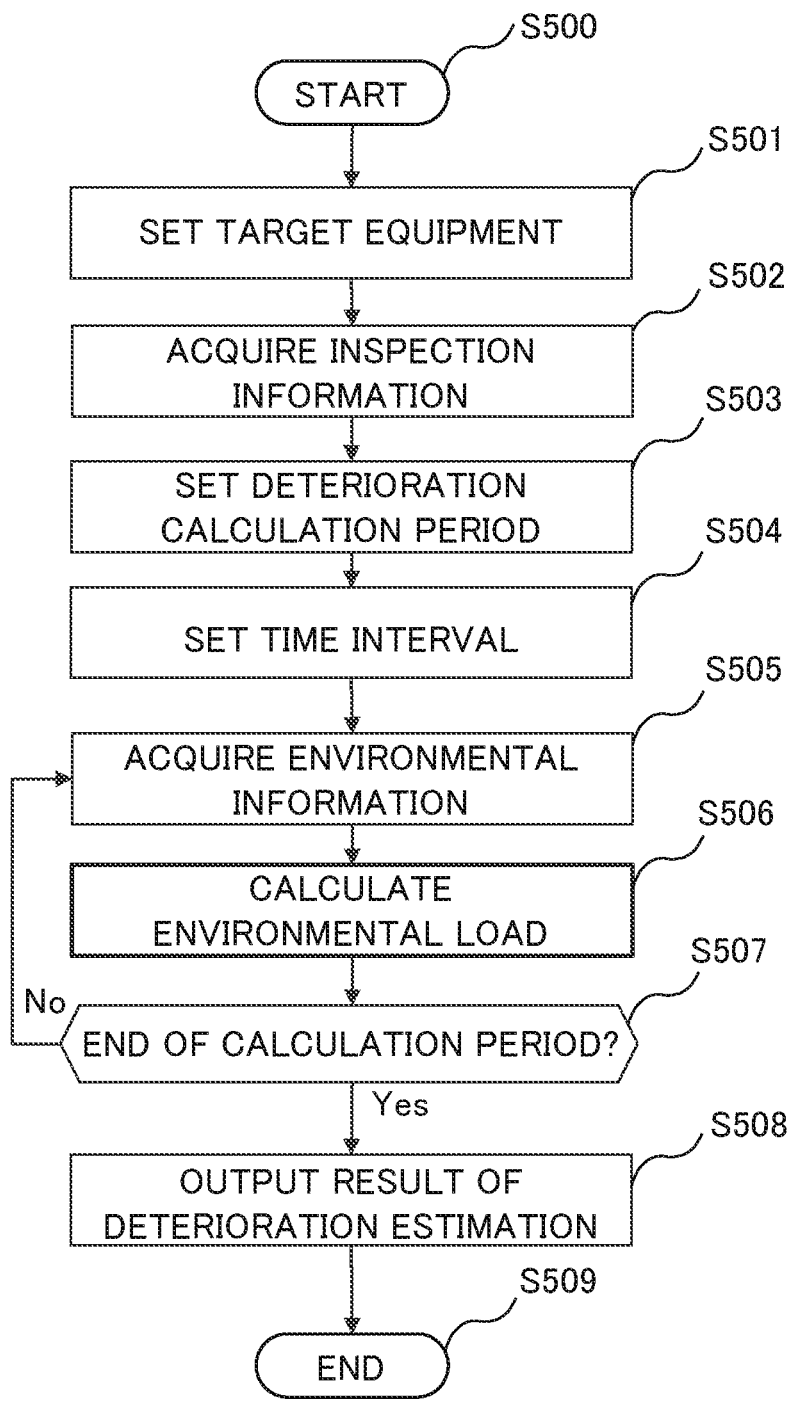
FIG. 7 is a flowchart for describing an example of a process flow in a first embodiment.

The calculation management part 102 has a function to execute programs and perform a predetermined process along a flowchart exemplarily shown in FIG. 7 to be mentioned later. The calculation management part 102 performs the process as shown in the flowchart in FIG. 7 based on contents set by the setting input part 103 and outputs the process result from the result output part 104.

The setting input part 103 has a function to receive the content of the setting information 110, which is inputted from the input device 14, for example, and pass it to the calculation management part 102. The setting input part 103 can select the ground equipment for which to execute deterioration prediction. Also, the setting input part 103 can command the calculation management part 102 to execute a deterioration prediction process.

Next, the information to be used in the process in this embodiment will be described. FIG. 3 is a chart showing an example of the configuration of the inspection information table 112. The inspection information table 112 (inspection-information storage part) stores the contents of inspections conducted on railroad ground equipment. In FIG. 3, the information that forms the entries of the inspection information table 112 includes items of equipment ID 201, type ID 202, line section ID 203, kilometrage 204, inspection date 205, and inspection value 206. The equipment ID 201 is an identification code for identifying inspection-target equipment. The type ID 202 is an identification code indicating the type of the equipment. The line section ID 203 and the kilometrage 204 represent the location where the equipment is installed and, in this example, indicate the distance from the start of the line section where the equipment is installed in terms of kilometrage. The inspection date 205 indicates the date of an inspection conducted on the equipment, and the inspection value 206 indicates the value of the inspection on that date. The inspection value 206 may differ from one type of equipment to another. For example, in a case where the type ID 202 is crossing barrier, the inspection value 206 corresponding to such information can be the time taken for the crossing barrier to complete its operation; on the other hand, in a case where the type ID 202 is track, the inspection value 206 can be set as the degree of corrosion of the rails. Here, this embodiment has been described based on the instance where one type of inspection value 206 is set for one type of information, but a plurality of types of inspection values 206 may be set for a plurality of types of information. For example, in a case where the type ID 202 is track, two types of inspection values, namely, the degree of corrosion of the rails and the amount of wear of the rails may be recorded.

Next, the environmental information table 113 will be described. FIG. 4 shows an example of the configuration of the environmental information table 113. The environmental information table 113 (environmental-information storage part) represents geographical conditions at various geographical points and longitudinal accumulation of weather data such as the temperatures and the amounts of precipitation collected at the geographical points. The entries of the environmental information table 113 in FIG. 4 include items of geographical point ID 301, geographical point 302, altitude 303, date 304, weather 305, highest temperature 306, lowest temperature 307, amount of rainfall/snowfall 308, and amount of solar radiation 309. The geographical point ID 301 is an identification code for identifying the geographical point of past observation of the environmental information, and is used to uniquely identify pieces of the environmental information 109. The geographical point 302 is information indicating the position on earth of the geographical point which is specified by the geographical point ID 301. In this example, the geographical point 302 is expressed in latitude and longitude. The altitude 303 indicates the altitude of the geographical point specified by the geographical point ID 301. The date 304 indicates the date of the past observation of the environmental information, and the weather 305, the highest temperature 306, the lowest temperature 307, the amount of rainfall/snowfall 308, and the amount of solar radiation 309 indicate the result of the observation on that date. Here, in the example in FIG. 4, the environmental information 109 observed in the past has been mentioned, but future environmental information 109 at each geographical point is likewise accumulated for the purpose of predicting future deterioration of the ground equipment. The future environmental information 109 can be predicted values that can be statistically obtained based on the past observation data.

Next, the conversion information table 117 will be described. FIG. 5 shows an example of the configuration of the conversion information table 117. The conversion information table 117 (conversion-information storage part) is used to associate the position of the maintenance-target ground equipment expressed in kilometrage with one of the positions indicating the geographical observation points in the environmental information table 113. The entries of the conversion information table 117 in FIG. 5 include items of line section ID 1801, kilometrage 1802, and position 1803. The line section ID 1801 is an identification code for uniquely identifying a railroad line section. Note that, in a case where the line section is managed separately for the inbound and outbound lines, the line section ID 1801 may be managed with separate IDs for the inbound and outbound lines. The kilometrage 1802 indicates the distance from the start of the line section specified by the line section ID 1801. The position 1803 is a set of numerical values indicating the kilometrage as an absolute position on earth and, in the example in FIG. 5, expressed in latitude and longitude. By using this conversion information table 117, the kilometrage of the ground equipment for which to perform the deterioration prediction can be associated with its absolute position on earth. Hence, it is possible to acquire the environmental information 109 that should be applied to the ground equipment for which to perform the deterioration prediction.

Figure 6:
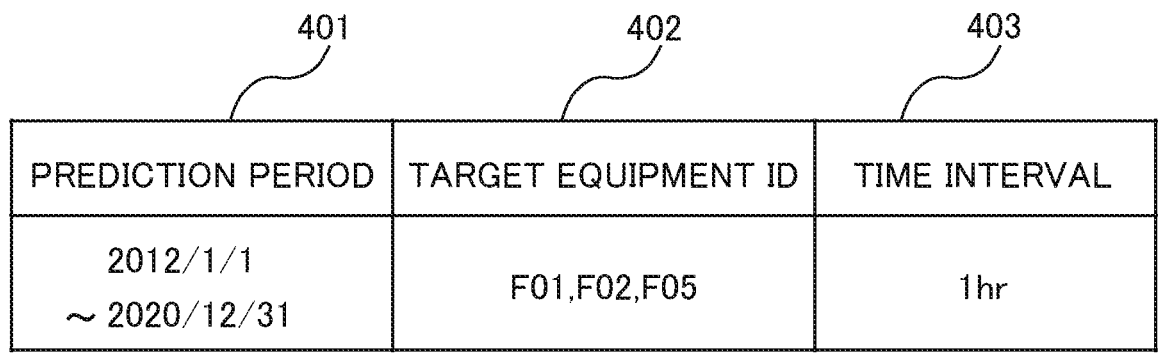
FIG. 6 shows an example of the configuration of setting information data 110.

Next, the setting information 110 will be described. FIG. 6 shows an example of the configuration of the setting information 110. The setting information 110 contains the content of the deterioration prediction process to be executed by the maintenance assistance apparatus 100 in this embodiment, and is data inputted from the input device 14 or the like and received via the setting input part 103. In FIG. 6, the setting information 110 includes items of prediction period 401, target equipment ID 402, and time interval 403. The prediction period 401 indicates the target period of the deterioration prediction to be executed. The target equipment ID 402 indicates the equipment ID of the target equipment for which to perform the deterioration prediction. Note that a plurality of pieces of target equipment may be selected instead of only one piece of target equipment. The time interval 403 indicates the time interval of the deterioration prediction (the time interval at which the deterioration prediction process is executed).

Next, description will be given of the deterioration prediction process on railroad ground equipment in this embodiment, which is executed based on the information described above. FIG. 7 is a flowchart for describing an example of the process in the first embodiment. The process flow in FIG. 7 is implemented by the calculation management part 102 of the maintenance assistance apparatus 100 by executing each program. First, after the apparatus 100 is powered on, the calculation management part 102 starts the process upon receipt of a process execution command from the input device 14 or the like (S500). The setting input part 103 then reads out the data stored in the setting information 110, refers to the target equipment ID 402, and sets the target equipment (S501). The setting input part 103 then refers to the inspection information table 112 and acquires the content of the inspection information 108 corresponding to the target equipment via the inspection-information extraction part 114 (S502). As a result, the most recent inspection value on the target equipment is acquired as a reference value for the deterioration prediction. Then, based on the prediction period recorded in the setting information 110, the setting input part 103 sets the target period of the deterioration prediction process as a deterioration calculation period (S503). Also, the setting input part 103 acquires the time interval setting from the setting information 110 (S504). The contents set as described above are passed from the setting input part 103 to the calculation management part 102, and the subsequent process below is executed.

First, the calculation management part 102 acquires the environmental information 109 corresponding to the prediction start time point, which is specified by the prediction period 401 in the setting information 110, via the environmental-information extraction part 115 (S505). In doing so, the calculation management part 102 utilizes the conversion information table 117 so that the environmental information 109 recorded at the nearest geographical point to the process-target equipment can be acquired. Specifically, the calculation management part 102 acquires the kilometrage of the equipment from the inspection information table 112, searches the conversion information table 117 for the closest record to the kilometrage, sets the acquired position as the position of the equipment, and acquires the corresponding environmental information 109 from the environmental information table 113 based on that position. Then, the environmental-load estimation part 105 performs environmental load calculation based on the acquired environmental information 109 (S506). An example of the environmental load calculation is shown below. This mathematical formula shows an instance where load on the equipment's component is accumulated due to the temperature difference that occurs each day.

$$E_{t_i} = E_{t_{i-1}} + \alpha \sum_{t=t_{i-1}}^{t=t_i} |HTemp(t) - LTemp(t)|$$

$E_{t_i}$: the environmental load at $t_i$
HTemp(t): the highest temperature at t
LTemp(t): the lowest temperature at t
α: a coefficient indicating the relationship between the environmental load and accumulation of the temperature difference Here, specifically, in the case where the target equipment is a track, the environmental load is the degree of corrosion of rails. The environmental-load estimation part 105 then acquires the inspection value of the degree of corrosion of the equipment from the most recent inspection information 108 in the inspection information table 112, and calculates the inspection value at the start of the prediction period as an initial value by utilizing the environmental information 109 up to the present and the estimated values of the environmental information 109 from the present to the start of the prediction period. The environmental-load estimation part 105 thereafter calculates the environmental load per time interval, which is recorded in the setting information 110, and iterates the load calculation until the end of the prediction calculation period comes (No in S507). If determining that the end has come, the environmental-load estimation part 105 outputs the result of the deterioration estimation and ends the process (Yes in S507, S508, S509). The result of the deterioration estimation can be outputted in any suitable form. For example, it is possible, for example, to present the predicted values of the environmental load in the prediction calculation period in a tabular form or to graphically output the accumulated values of the environmental load in the prediction calculation period in a histogram.

According to this embodiment, the deterioration of railroad ground equipment can be predicted with the influence of its installation environment taken into consideration.

Second Embodiment

Next, a second embodiment of the present invention will be described. In this embodiment, the deterioration of target ground equipment is predicted by utilizing information on transportation by the trains that are operated in the railroad line section to which the ground equipment belongs, in addition to the environmental information in the first embodiment. Note that description of the same elements and the same parts of the process as those in the first embodiment will be omitted to avoid redundancy, and description will be given of the characteristic parts of the second embodiment.

Figure 8:
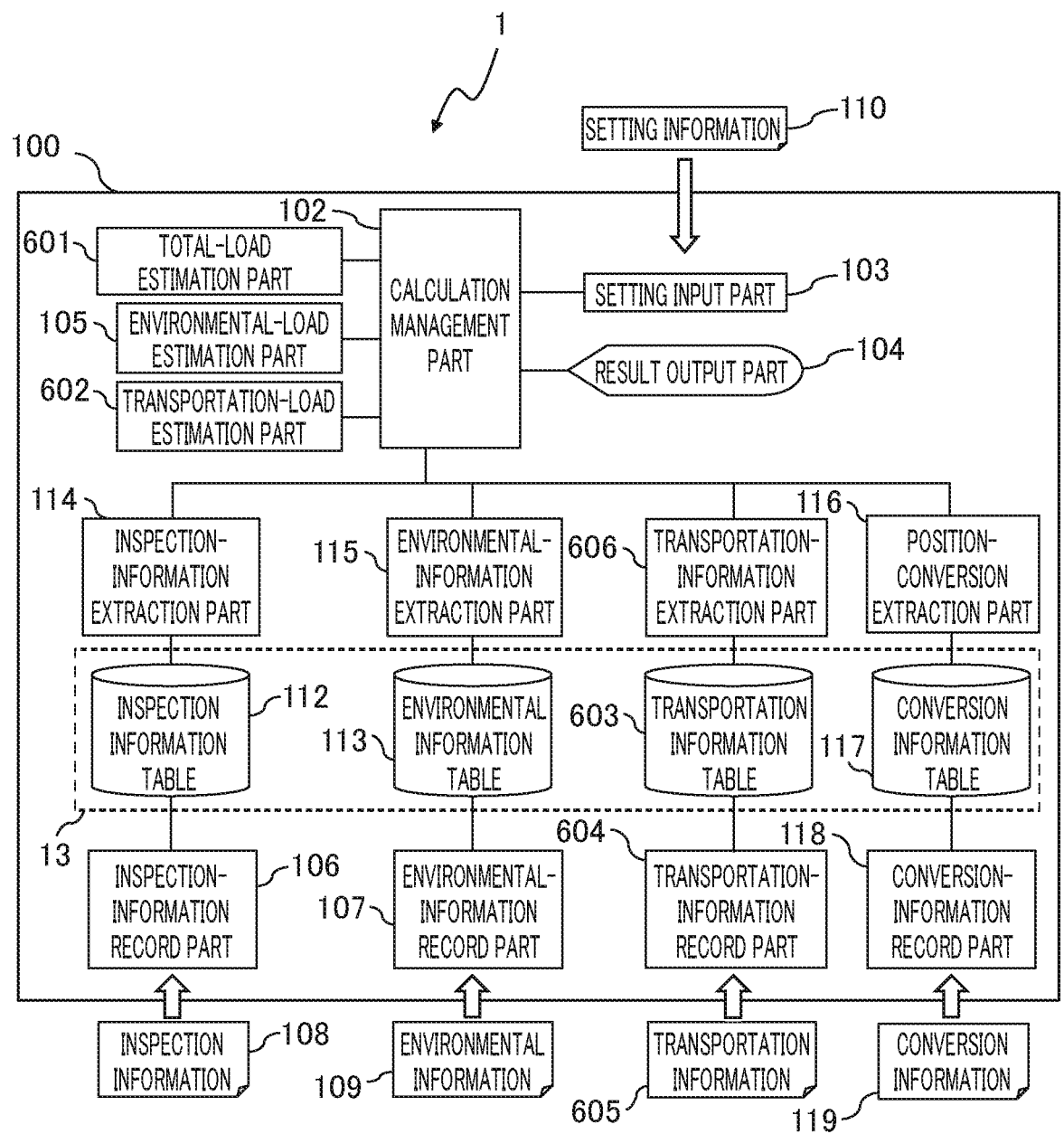
FIG. 8 is a diagram showing an example of the configuration of a maintenance assistance system for railroad ground equipment according to a second embodiment of the present invention.

FIG. 8 is a diagram showing an example of the configuration of a maintenance assistance system 1 for railroad ground equipment according to this embodiment. A maintenance assistance apparatus 100, which is the core of the maintenance assistance system 1, is a computer having the hardware configuration exemplarily shown in FIG. 2. However, the maintenance assistance apparatus 100 differs from that in the first embodiment in that it includes: a transportation-load estimation part 602 configured to estimate transportation load; a total-load estimation part 601 configured to integrally estimate the transportation load and the environmental load; and a transportation-information record part 604, a transportation information table 603, and a transportation-information extraction part 606 configured to manage input of transportation information 605, which is base information for the transportation load estimation.

The transportation-load estimation part 602 has a function to estimate the deterioration of railroad ground equipment based on the transportation information 605, which is inputted via the input device 14 or the communication interface 16. The transportation load refers to weight load or the like applied to the rails when a train travels thereon, for example. The transportation-load estimation part 602 is capable of calculating the weight load or the like based on the transportation information 605.

The transportation-information record part 604 has a function to record the inputted transportation information 605 into the transportation information table 603. The transportation-information extraction part 606 has a function to extract corresponding transportation information 605 in response to an instruction from the calculation management part 102.

Next, the transportation information table 603 will be described. FIG. 9 shows an example of the configuration of the transportation information table 603. The transportation information table 603 (transportation-information storage part) records conditions of travel of trains at various geographical points, the trains being operated in particular railroad line sections. The transportation information table 603 includes items of train ID 801, line section ID 802, inter-station area ID 803, date 804, time 805, kilometrage 806, speed 807, acceleration/deceleration rate 808, and amount of transportation 809. The train ID 801 is an identification code for uniquely identifying a train. The line section ID 802 is an identification code for uniquely identifying the target line section, and the inter-station area ID 803 is an identification code for specifying the stations between which the train operates. For example, by specifying the line section ID 802 and the kilometrage 806 in the transportation information 603 in FIG. 9, the train ID 801 of each train passing that geographical point can be acquired, as well as the date 804, the time 805, and the speed 807 of the passage and the acceleration/deceleration rate 808 and the amount of transportation 809 during the passage. The amount of transportation 809 may be any of the number of passengers transported by the train, the weight of the transported content, and the total weight including the weight of the train. Note that the conditions of travel (speed and acceleration/deceleration rate) of a train at a specific line section at a specific time can be acquired based on the service planning diagram and the run curve of the train. For this reason, the conditions of travel of those trains that are planned to be operated in the future can be set in the transportation information table 603 in advance based on the date 804 and the time 805. The speed 807 provides an index of the duration for which the weight of the train is applied to the rails, for example. The acceleration/deceleration rate 808 provides an index related to the wear of the rails by the treads of the wheels of the train. For those trains operated in the past, the conditions of travel of those trains can be acquired from the actual operation management record. Also, as the amount of transportation 809, the actual value of transportation may be used or a planned value of transportation may be used.

Figure 10:
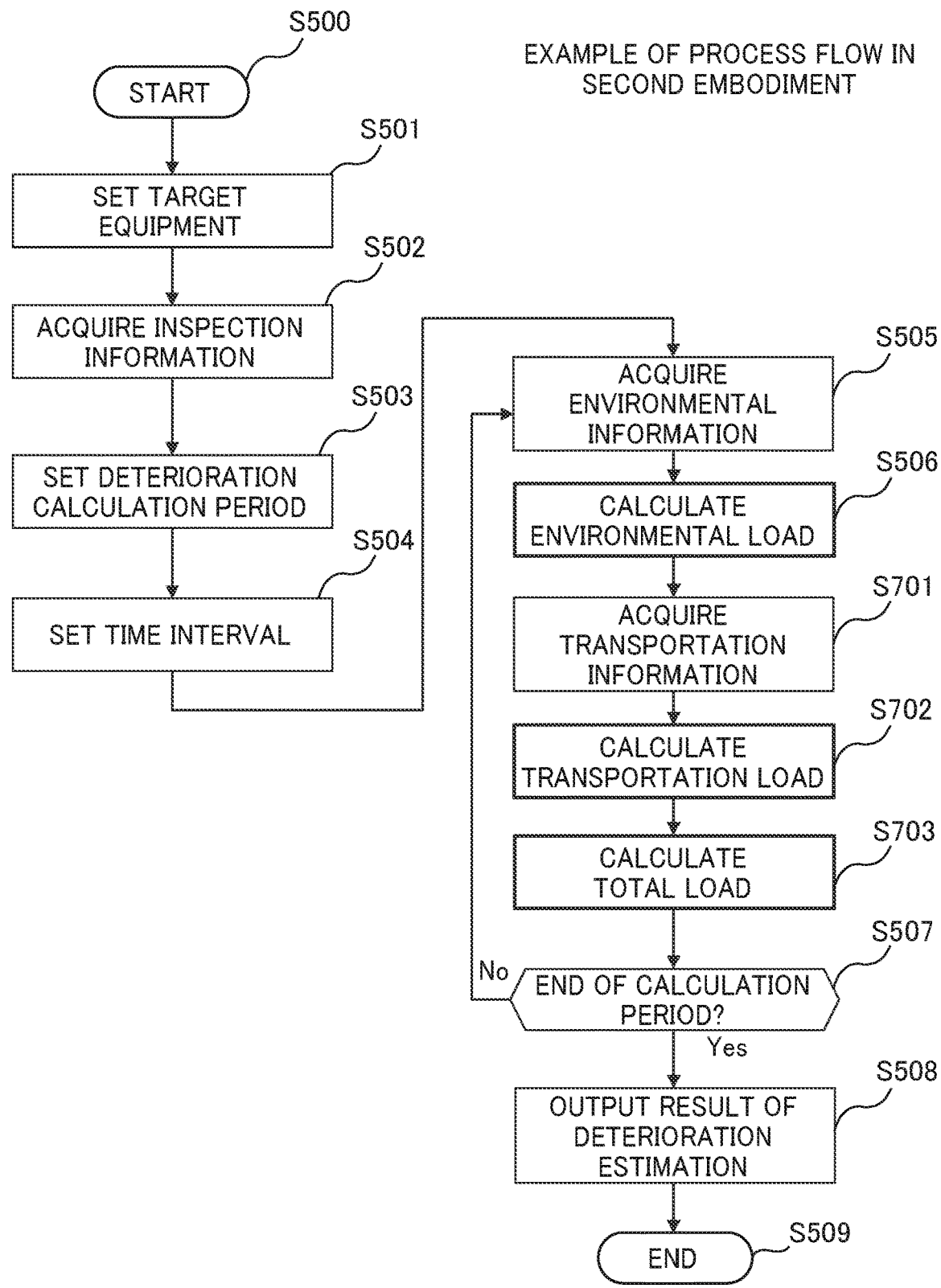
FIG. 10 is a flowchart for describing an example of a process flow in the second embodiment.

Next, the process executed in this embodiment will be described. FIG. 10 shows an exemplary flowchart for implementing the process in this embodiment. The basic configuration of the flowchart in FIG. 10 is similar to that in the first embodiment, except a part of the process utilizing the transportation information 605. The following description will be given only of this part related to the transportation information 605. Referring to FIG. 10, after the environmental load calculation in S506, the calculation management part 102 acquires the transportation information 605 via the transportation-information extraction part 606 (S701). Here, the transportation-information extraction part 606 searches for and acquires the transportation information 605 by comparing line sections passing near the target equipment with the kilometrage associated with the equipment. In this embodiment, the transportation-information extraction part 606 specifies the line section ID and the kilometrage corresponding to the target equipment from the inspection information table 112, extracts the line section ID, the kilometrage, and all the trains that pass during a period having the length of the time interval at which the transportation load estimation is executed, from the transportation information table 603, and calculates the transportation load by adding up the amounts of transportation of the trains (S702). The transportation load can be calculated by the following formula, for example.

$$T_{t_i} = T_{t_{i-1}} + \beta A_{t_{i-1}} \sum_{t=t_{i-1}}^{t=t_i} Tr(t)$$

$T_{t_i}$: the transportation load at $t_i$
$Tr(t)$: the amount of transportation at t
$A_{t_i}$: the total load at $t_i$
$\beta$: a coefficient indicating the relationship between the transportation load and accumulation of the amount of transportation The coefficient $\beta$ can be optionally determined based on the actual past influence of the amount of transportation on specific ground equipment. The calculation management part 102 calculates the total load by adding this transportation load to the environmental load, which is already calculated (S703). Assume for example that the ground equipment is a railroad and the deterioration prediction target is the wear of rails and that the predicted environment load and the predicted transportation load in a given period are 0.5 mm and 0.7 mm, respectively. In this case, the total load is calculated to be 1.2 mm as the sum of the two. The calculation of the total load is iterated until the prediction calculation period is determined to have ended in the determination step S507.

Figure 11:
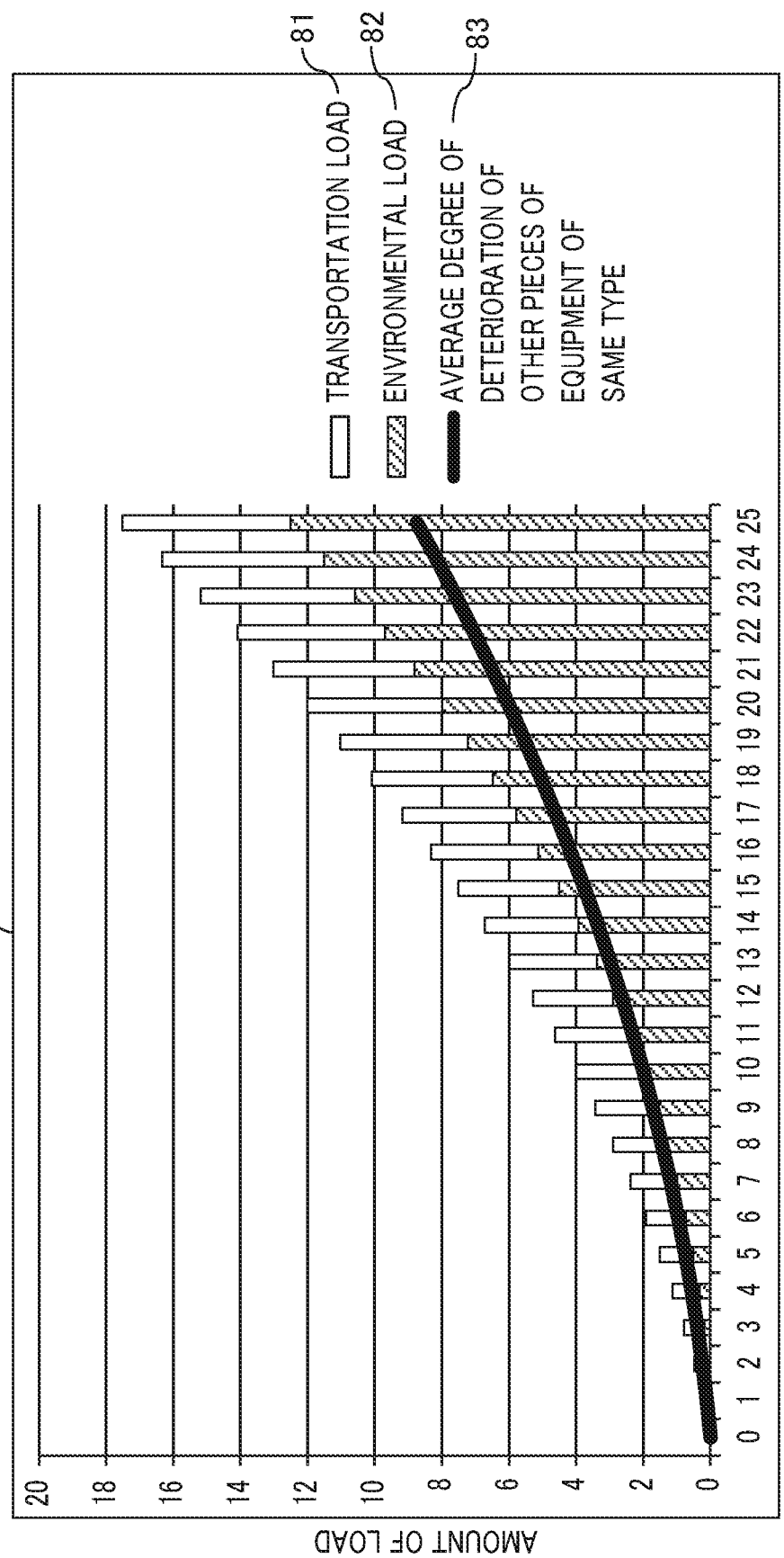
FIG. 11 is an example of the output of a result output part 104 and is an exemplary characteristic chart showing the amounts of loads on equipment related to the deterioration of the equipment.

Next, an example of the output of the result output part 104 in this embodiment will be described. FIG. 11 is an exemplary characteristic chart showing the amounts of loads on equipment related to the deterioration of the equipment, which is outputted by the result output part 104, in this embodiment. For example, in the case where the result of the prediction calculation is related to the wear of rails, a graph 80 shows the amount of wear by transportation load 81 and the amount of wear by environmental load 82, the sum of which is shown as the total amount of load. Note that, in the example in FIG. 11, in order that this amount of load obtained by the prediction calculation can be easily compared with the amounts of load on other pieces of equipment of the same type, an average degree of deterioration 83 of those other pieces of equipment of the same type, which is the average of the results of prediction calculation thereon, is superimposed and displayed. The average degree of deterioration 83 on the other pieces of equipment of the same type can be calculated from the results of the past prediction calculation executed and recorded by the calculation management part 102. As exemplarily shown in FIG. 11, by showing the breakdown of the amount of load at each time point of the prediction calculation, it is possible to easily determine what factors contribute to the progression of the deterioration. Also, the degree of progression of the deterioration can be compared with the other pieces of equipment of the same type, and therefore the influence of the equipment installation location on the deterioration and the like can be analyzed as well.

According to this embodiment, the deterioration of railroad ground equipment can be predicted with both the influence of the environment and the influence of the transportation taken into consideration.

Third Embodiment

Next, a third embodiment of the present invention will be described. This embodiment aims to further improve the accuracy of the prediction in the second embodiment, in which the environmental information and the transportation information are combined, by taking into account the influence of behavior of trains on the deterioration of the prediction target ground equipment, the trains passing the geographical point where the equipment is installed. In the following, description of the same elements and the same parts of the process as those in the first and second embodiments will be omitted to avoid redundancy, and description will be given of the characteristic parts of this embodiment.

Figure 12:
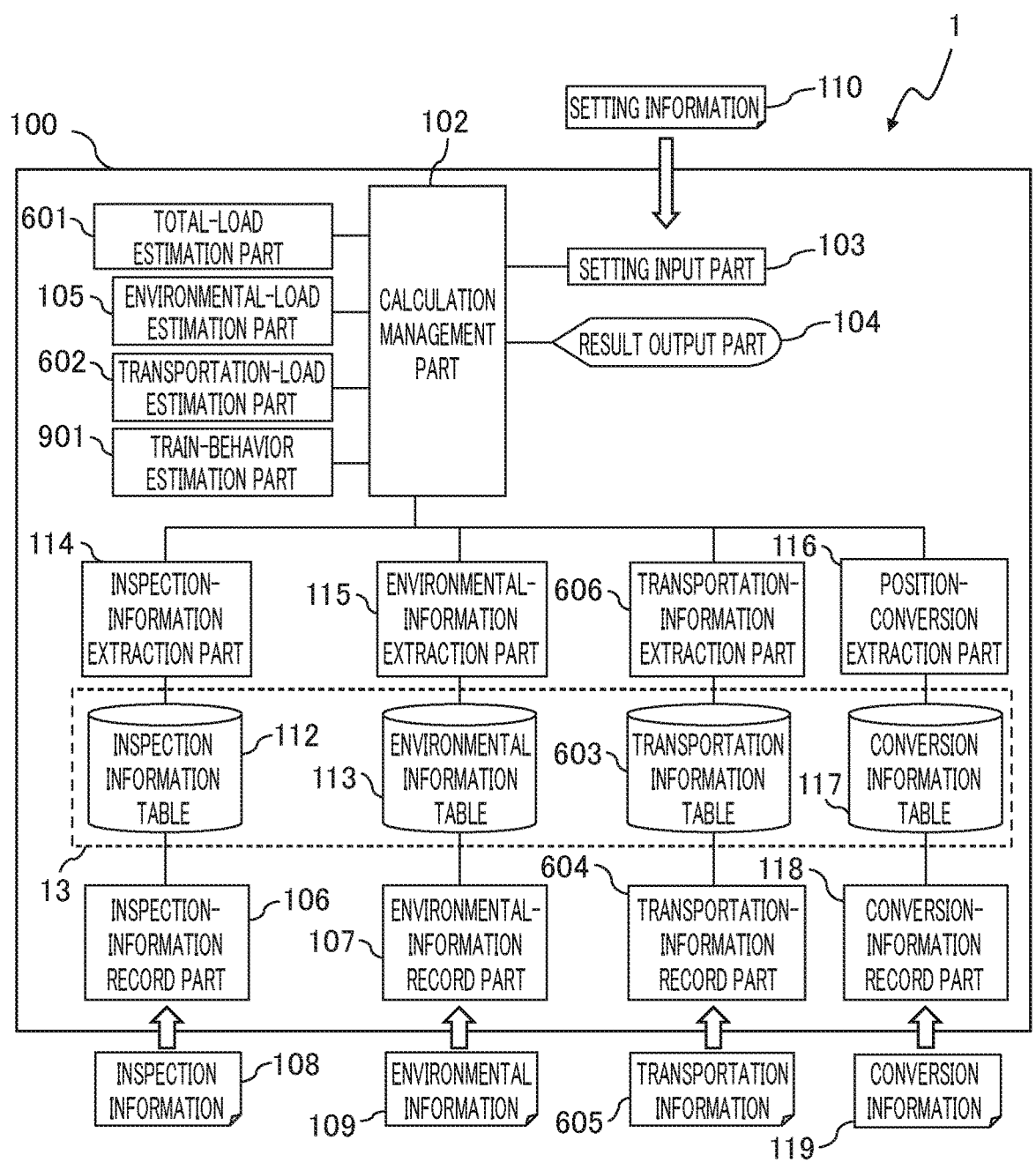
FIG. 12 is a diagram showing an example of the configuration of a maintenance assistance system for railroad ground equipment according to a third embodiment of the present invention.

FIG. 12 is a diagram showing an example of the configuration of a maintenance assistance system 1 for railroad ground equipment according to the third embodiment. The configuration of a maintenance assistance apparatus 100 included in the system 1 in FIG. 12 is substantially the same as that in the second embodiment, except that it includes a train-behavior estimation part 901. This train-behavior estimation part 901 has a function to simulate behavior of a train passing the target equipment by using the environmental information 109 and the transportation information 605 and estimate the influence of that behavior on the deterioration of the equipment. For example, the rocking of the cars of a train in a strong wind influences the track, and the slip or skid of a train on a slope influences the rails. With the train-behavior estimation part 901, the prediction calculation can take factors such as these influences into account. Note that additional information necessary for estimating such train behavior is recorded in the environmental information 109 and the transportation information 605 in advance. For example, an item of wind speed (m/s) is provided in the environmental information 109 in the case where the train behavior in strong winds is additionally taken into account, and an item of track slope (‰) is provided in the transportation information 605 in the case where the influence of skid or slip of a train is additionally taken into account.

Figure 13:
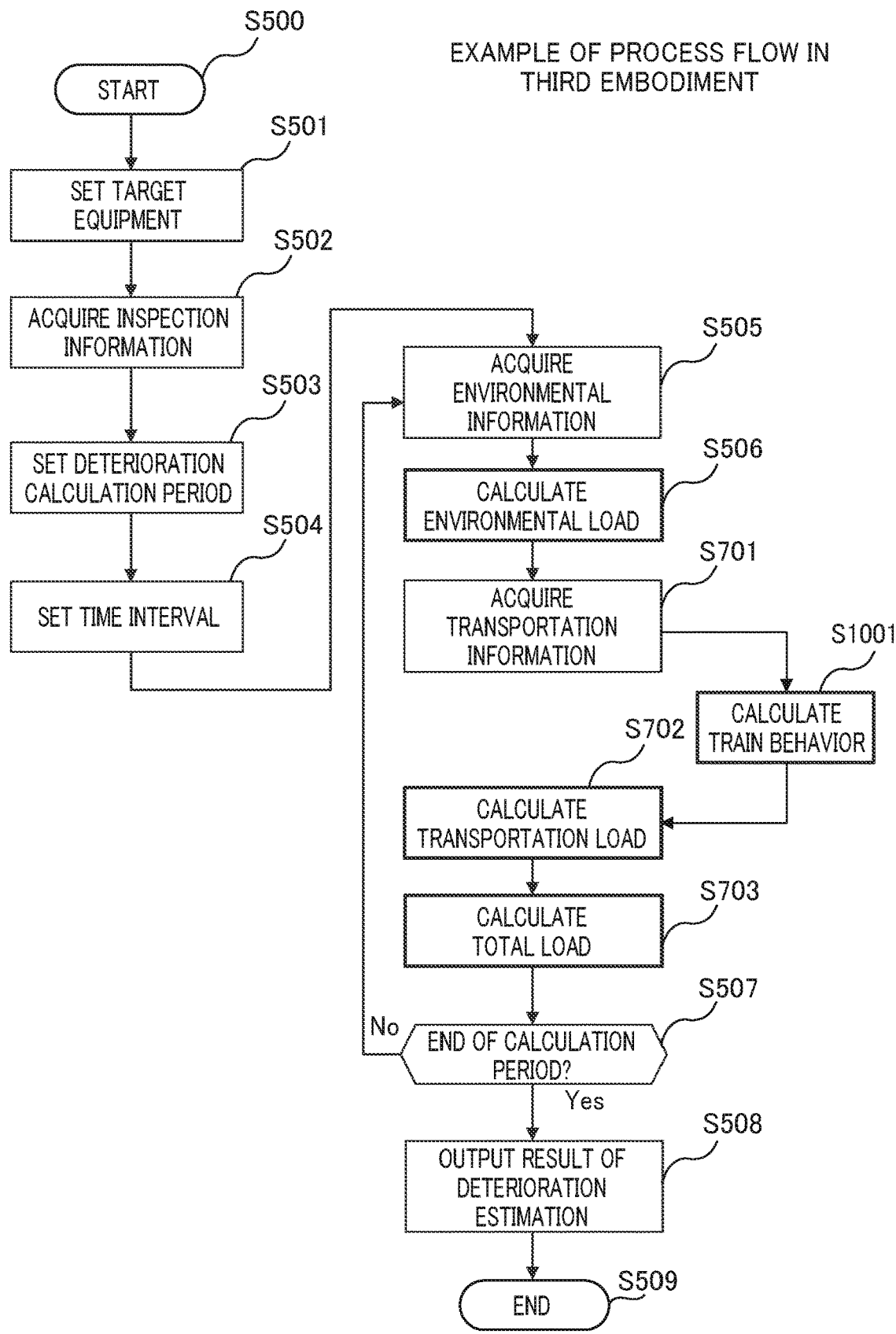
FIG. 13 is a flowchart for describing an example of a process flow in the third embodiment.

Next, the process executed in the third embodiment will be described. FIG. 13 shows an exemplary flowchart for implementing the process in the third embodiment. The basic configuration of the flowchart in FIG. 13 is similar to that in second embodiment, except a part related to a step of calculating the train behavior (S1001). The following description will be given only of the part related to this train-behavior calculation step S1001. Referring to FIG. 13, the train-behavior estimation part 901 executes train-behavior estimation calculation by using the environmental information 109, which is acquired in S505, and the transportation information 605, which is acquired in S701. For the slip or skid of each train, for example, an expected amount of slip or skid is calculated for each train as the probability of occurrence of slip or skid from a probability formula exemplarily shown below.

Expected amount of slip or skid=Σ(Pr(weather, slope, vehicle type))

Pr(weather, slope, vehicle type): a probability formula based on previous observation In an example of the calculation, for each train extracted from the transportation information table 603, the above probability formula is applied to find the probability of occurrence of slip or skid; then, an increase in transportation load which is obtained by multiplying the amount of transportation of the train by the probability of occurrence of slip or skid, is multiplied by an empirical amount of load increase during slip or skid (e.g. increase in amount of rail wear by slip or skid). In this way, the deterioration prediction can take the slip or skid of each train into account. Note that the item of vehicle type is in the above formula to reflect the situation where the probability of occurrence of slip or skid generally changes in accordance with the proportion of the power car(s) included in the train.

As described above, according to the third embodiment, the prediction calculation of the amount of load on railroad ground equipment can be performed with the influence of the behavior of each train taken into account as well.

Fourth Embodiment

Next, a fourth embodiment of the present invention will be described. In this embodiment, the deterioration of target ground equipment is predicted by further utilizing information on track maintenance, signal maintenance, and various kinds of operations for safe train operation conducted on the ground equipment, in addition to the environmental information in the first embodiment. Note that description of the same elements and the same parts of the process as those in the first embodiment will be omitted to avoid redundancy, and description will be given of the characteristic parts of the fourth embodiment.

Figure 14:
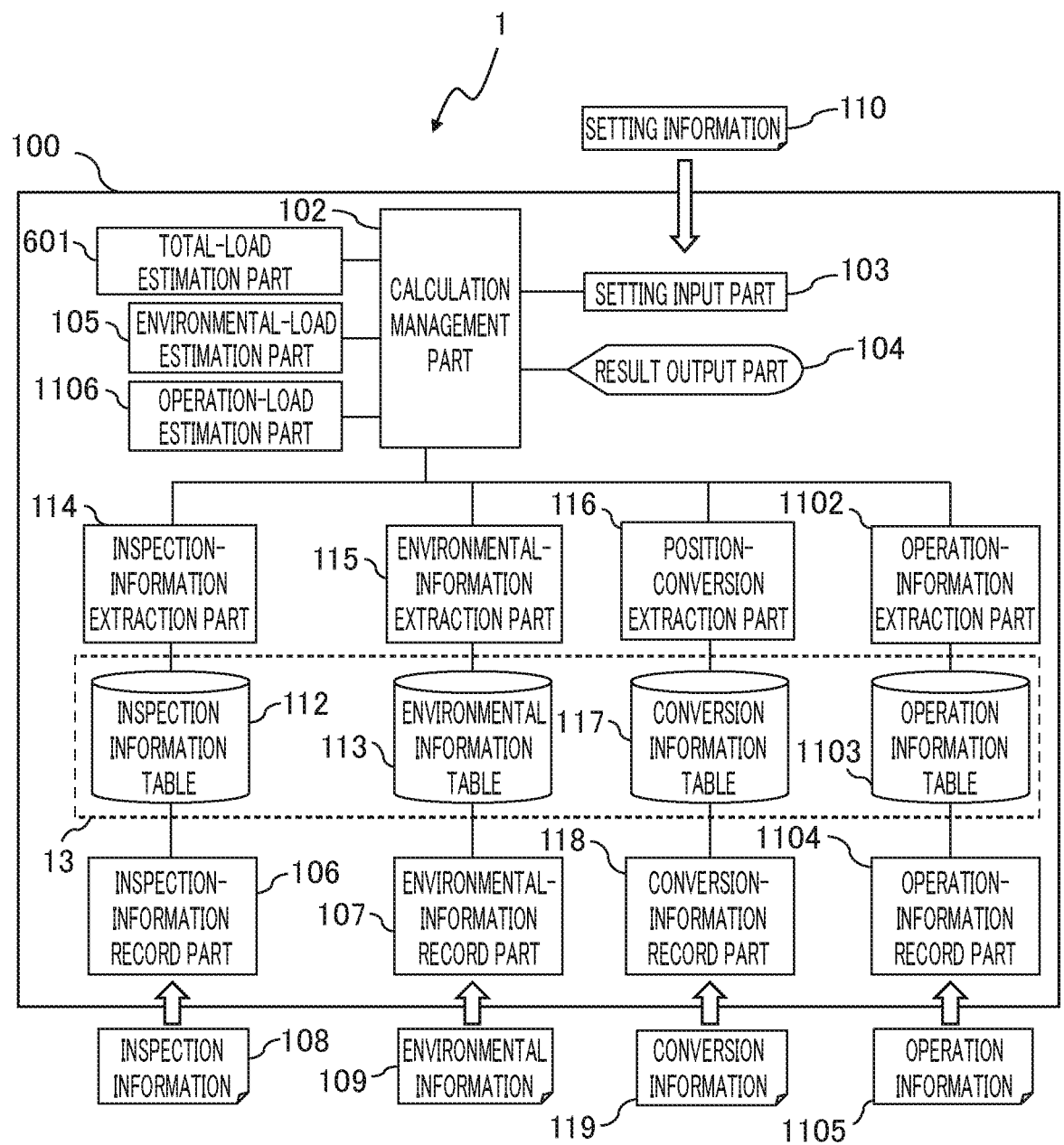
FIG. 14 is a diagram showing an example of the configuration of a maintenance assistance system for railroad ground equipment according to a fourth embodiment of the present invention.

FIG. 14 is a diagram showing an example of the configuration of a maintenance assistance system 1 for railroad ground equipment according to this embodiment. A maintenance assistance apparatus 100, which is the core of the maintenance assistance system 1, is a computer having the hardware configuration exemplarily shown in FIG. 2. However, the maintenance assistance apparatus 100 differs from that in the first embodiment in that it includes: an operation-information record part 1104 having a function to record, into an operation information table 1103, operation information 1105 in which the contents of operations conducted on ground equipment are recorded; an operation-information extraction part 1102 having a function to extract the operation information 1105 necessary for the deterioration prediction from the operation information table 1103; and an operation-load estimation part 1106 having a function to calculate operation load applied to the target ground equipment by using the extracted operation information 1105. The operation information 1105 extracted from the operation-information extraction part 1102 is passed to the calculation management part 102.

Next, the operation information 1105 will be described. FIG. 15 shows an example of the configuration of the operation information table 1103 (operation-information storage part), which stores the operation information 1105. In the operation information 1105, there are recorded items of line section ID 1601, kilometrage 1602, date 1603, time 1604, and operation content 1605 indicating the content of the operation conducted at a particular location of a particular line section on a particular data and time which are specified by the line section ID 1601, the kilometrage 1602, the date 1603, the time 1604.

Figure 16:
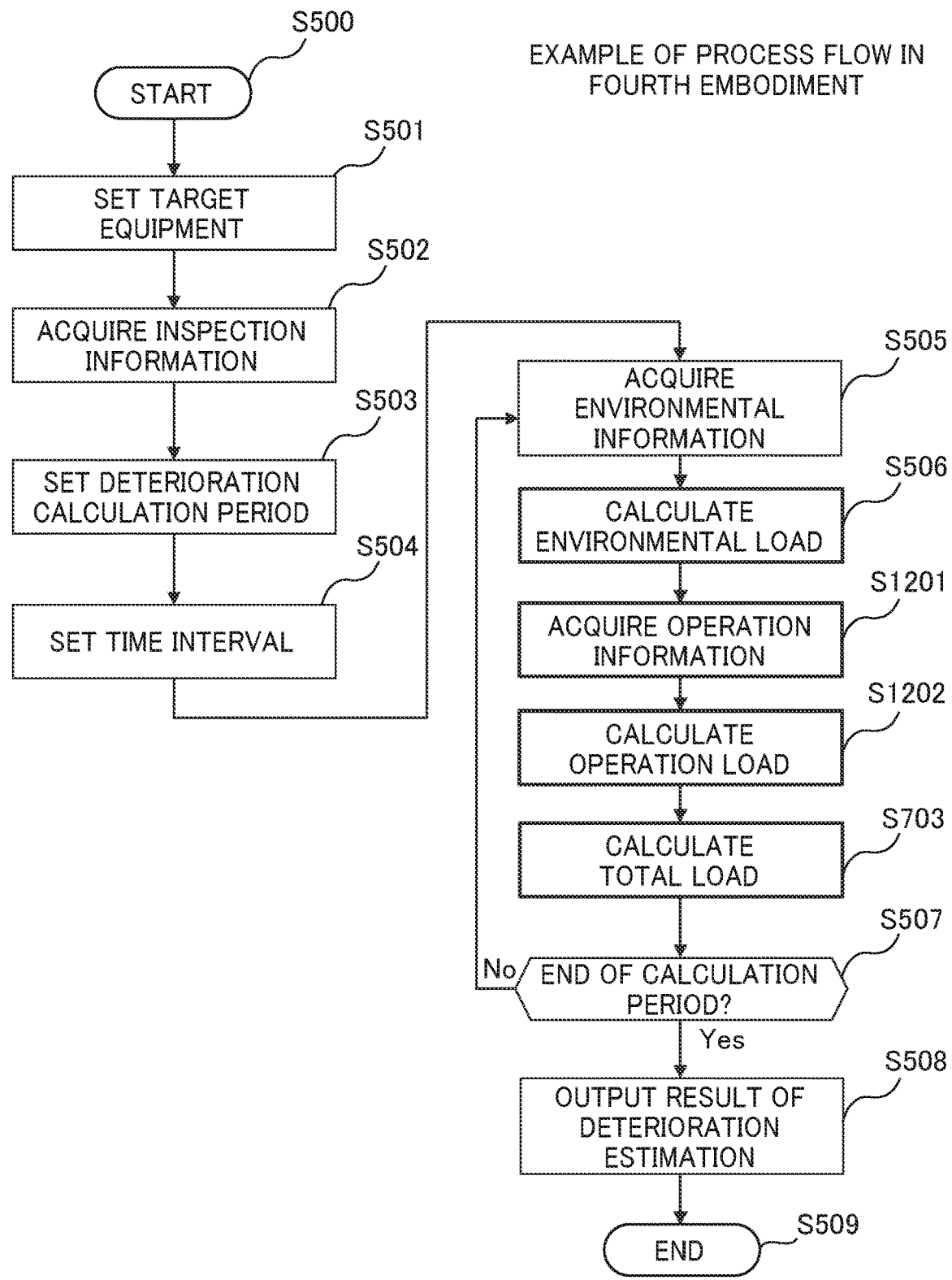
FIG. 16 is a flowchart for describing an example of a process flow in the fourth embodiment.

Next, the process executed in this embodiment will be described. FIG. 16 shows an exemplary flowchart for implementing the process in this embodiment. The basic configuration of the flowchart in FIG. 16 is similar to that in the first embodiment, except a part of the process utilizing the operation information 1105. The following description will be given only of this part related to the operation information 1105. After the environmental load is calculated in S506, the operation-information extraction part 1102 extracts the contents of the operations conducted around the position of the target equipment within the prediction period, from the operation information table 1103 based on the line section ID 1601, the kilometrage 1602, the date 1603, and the time 1604 (S1201). The operation-load estimation part 1106 calculates operation load for each piece of the extracted operation information 1105 that is related to the deterioration prediction calculation (S1202). For example, for the influence of spray of anti-freeze agent, the influence is quantified from the following formula.

Corrosion load by operation=γΣ (the average amount of spray of the anti-freeze agent)

γ: a coefficient indicating the correlation between the corrosion of rails and the average amount of spray of the anti-freeze agent Thereafter, the total-load estimation part 601 adds up the calculated environmental load and the calculated operation load to obtain a total load, and then iterates the calculation of the total load until the prediction calculation period ends (the determination step in S507).

As described above, according to this embodiment, the deterioration of railroad ground equipment resulting from operations conducted due to the environmental condition around the ground equipment can be reflected on the deterioration prediction.

Fifth Embodiment

Next, a fifth embodiment of the present invention will be described. When the condition of deterioration of railroad ground equipment is to be estimated, it may be impossible to utilize the environmental information on that target equipment. This embodiment shows an instance where, in the above situation, the environmental load on the railroad ground equipment is calculated by estimating the environmental information around the geographical point of adjacent railroad ground equipment based on how the adjacent railroad ground equipment has been deteriorated. Note that description of the same elements and the same parts of the process as those in the first embodiment will be omitted to avoid redundancy, and description will be given of the characteristic parts of the fifth embodiment.

Figure 17:
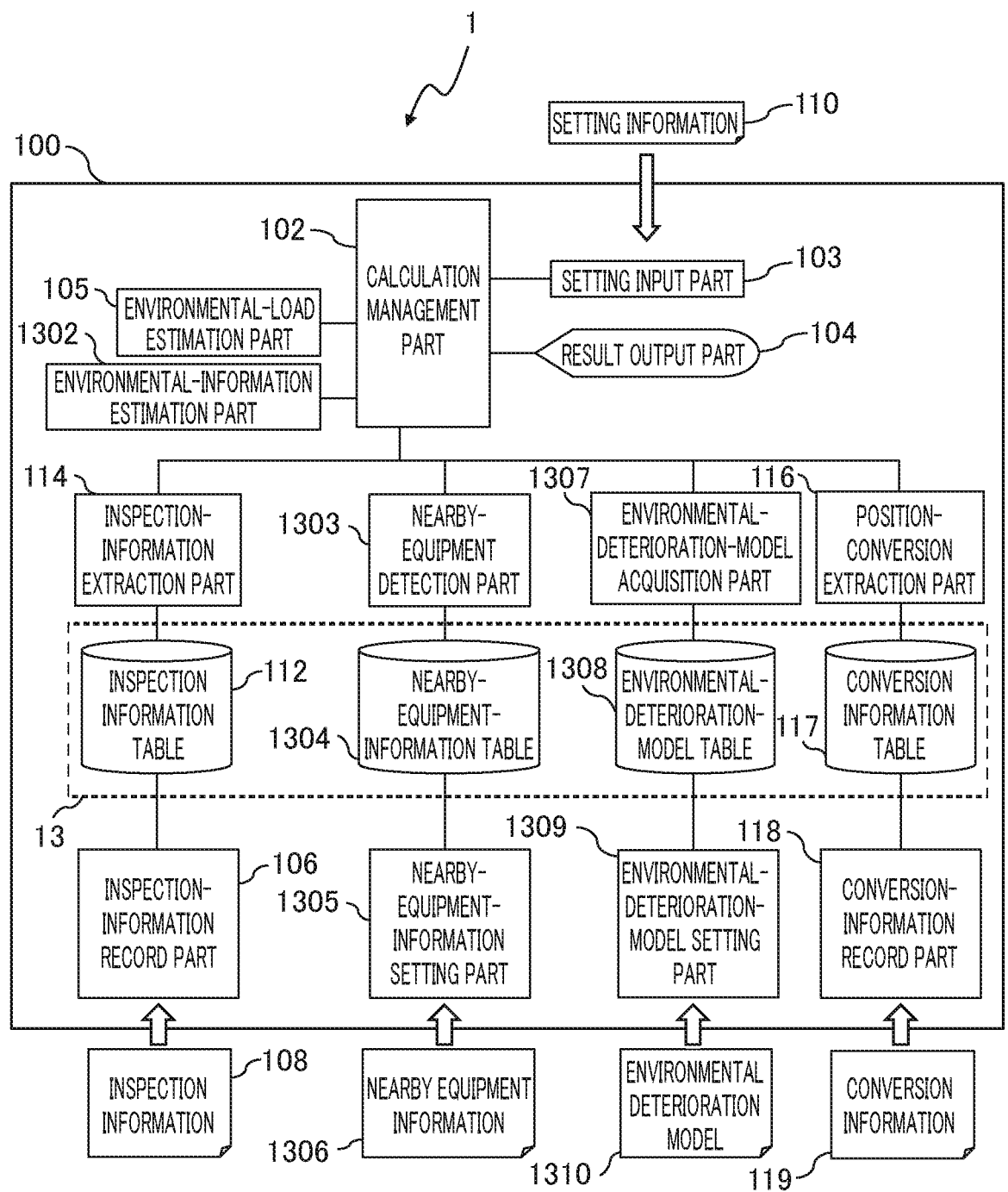
FIG. 17 is a diagram showing an example of the configuration of a maintenance assistance system for railroad ground equipment according to a fifth embodiment of the present invention.

FIG. 17 is a diagram showing an example of the configuration of a maintenance assistance system 1 for railroad ground equipment according to the fifth embodiment. A maintenance assistance apparatus 100, which is the core of the maintenance assistance system 1, is a computer having the hardware configuration exemplarily shown in FIG. 2. However, the maintenance assistance apparatus 100 differs from that in the first embodiment in that it includes a nearby-equipment-information setting part 1305, a nearby-equipment-information table 1304, a nearby-equipment detection part 1303, an environmental-deterioration-model setting part 1309, an environmental-deterioration-model table 1308, an environmental-deterioration-model acquisition part 1307, and an environmental-information estimation part 1302, in place of the functional parts and data for executing the process related to the environmental information in the first embodiment. The nearby-equipment-information setting part 1305 has a function to record later-described nearby equipment information 1306 into the nearby-equipment-information table 1304 upon input of the nearby equipment information 1306 from the setting input part 103. The nearby-equipment detection part 1303 is configured to detect, from the nearby-equipment-information table 1304, information on different ground equipment around ground equipment for which to execute the deterioration prediction calculation based on the installed location thereof. On the other hand, the environmental-deterioration-model setting part 1309 has a function to set environmental deterioration models 1310. The environmental-deterioration-model acquisition part 1307 is configured to acquire one of the environmental deterioration models 1310, which are accumulated in the environmental-deterioration-model table 1308 and pass it to the calculation management part 102.

FIG. 18 shows an example of the configuration of the nearby-equipment-information table 1304 (nearby-equipment-information storage part). The nearby-equipment-information table 1304 includes items of equipment ID 1701, line section ID 1702, installation kilometrage 1703, and type ID 1704. The equipment ID 1701 indicates an identification code for identifying nearby equipment, and the line section ID 1702 indicates the line section where the nearby equipment specified by the equipment ID 1701 is installed. The installation kilometrage 1703 indicates the installed location of the nearby equipment in the line section, and the type ID 1704 is the type of the nearby equipment.

FIG. 19 shows an example of the configuration of the environmental-deterioration-model table 1308. Each environmental deterioration model 1310 as an entry recorded in the environmental-deterioration-model table 1308 (environmental-deterioration-model storage part) includes items of model ID 1901 as an identification code, type ID 1902 for specifying target equipment, explanatory variable 1903, and function form 1904. The explanatory variable 1903 is related to the type of equipment and is a list of a main factor(s) that influences its environmental deterioration. In the example in FIG. 19, in a case where the type ID 1902 is "overhead wire," wind speed and temperature difference are listed as the main factors that influence its deterioration. In the item of function form 1904, the relationship between the deterioration of the equipment and the factor (s) listed in the explanatory variable 1903 is shown in the form of a function. In the example in FIG. 19, that the deterioration of an overhead wire progresses in accordance with accumulation of the product of the wind speed and the temperature difference to which the overhead wire is exposed, is recorded.

Figure 20:
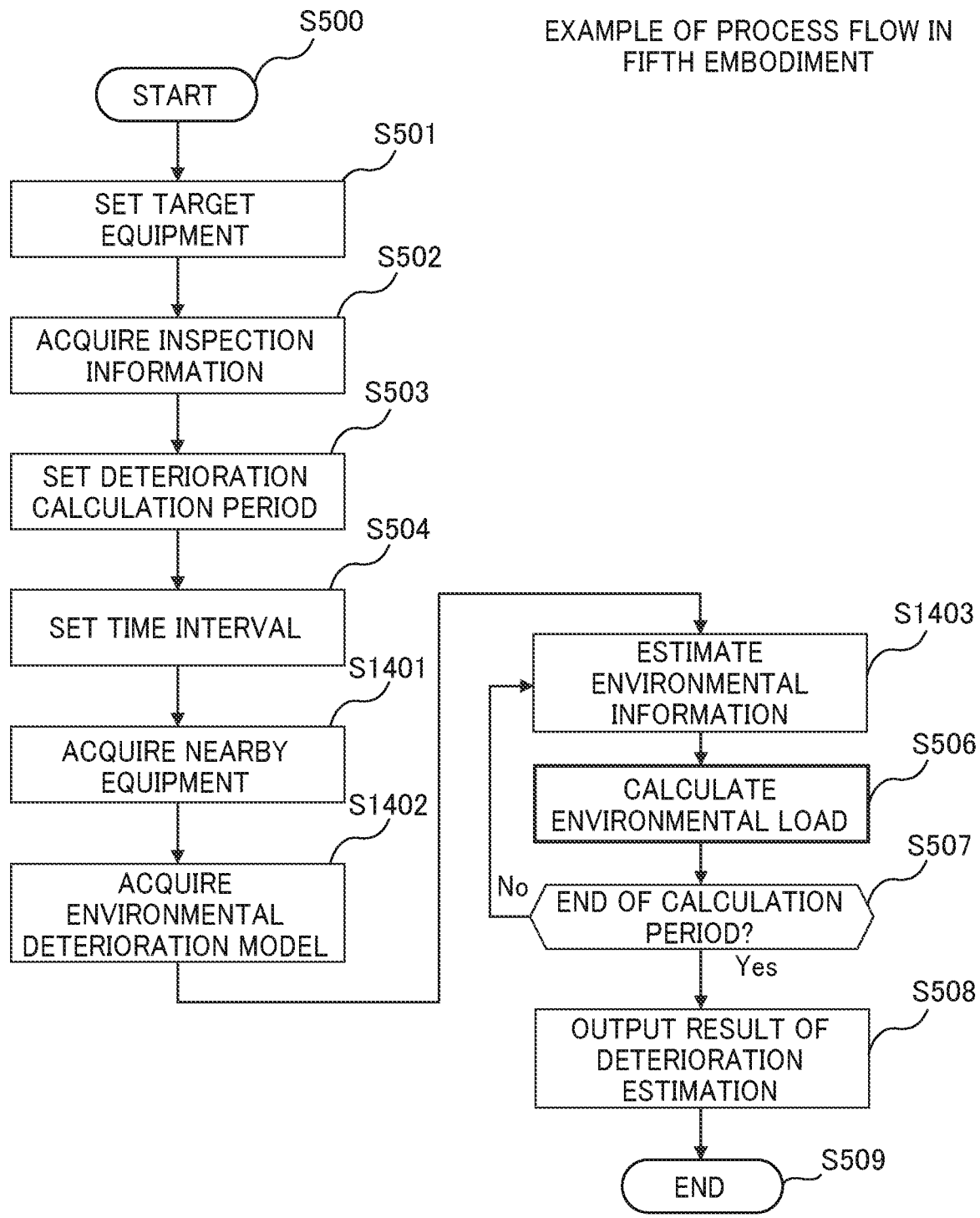
FIG. 20 is a flowchart for describing an example of a process flow in the fifth embodiment.

Next, the process executed in this embodiment will be described. FIG. 20 shows an exemplary flowchart for implementing this embodiment. The basic configuration of the flowchart in FIG. 20 is similar to that in the first embodiment, except a part of the process utilizing the nearby equipment information 1306 and the environmental deterioration model 1310. The following description will be given only of this difference. Note that this embodiment assumes a situation where the environmental-information extraction part 115 attempts to acquire the environmental information 109 on the target equipment in the process in the first embodiment but fails to acquire that environmental information 109.

Referring to FIG. 20, after the time interval is set in S504, the calculation management part 102 extracts the equipment ID 1701 and the type ID 1704 of the closest nearby ground equipment to the prediction-calculation-target ground equipment from the nearby-equipment-information table 1304 based on the line section ID and the kilometrage of the target ground equipment via the nearby-equipment detection part 1303 (S1401). Then, the environmental-deterioration-model acquisition part 1307 acquires the environmental deterioration model 1310 for estimating the environmental information on the acquired nearby equipment from the environmental-deterioration-model table 1308 (S1402). Assume for example that an attempt is made to predict the deterioration of the track in a line section at a specific location, but the corresponding environmental information cannot be acquired. In this case, the nearby-equipment detection part 1303 searches the nearby-equipment-information table 1304 for different ground equipment around the track. If, for example, an overhead wire is consequently extracted as that equipment, the environmental-deterioration-model acquisition part 1307 acquires the environmental deterioration model for overhead wire from the environmental-deterioration-model table 1308 (the model ID "M01" in FIG. 19).

Then, in S1403, which is an environmental-information estimation step, the environmental-information estimation part 1302 uses the acquired environmental deterioration model 1310 to estimate the deterioration of the deterioration-prediction-target ground equipment by an environmental component(s) based on the condition of deterioration of the nearby equipment. Specifically, first, the explanatory variable(s) with which to predict the deterioration is specified by referring the type ID of the equipment for which to execute the deterioration prediction. In the example in FIG. 19, if the target equipment is a track, temperature difference is its explanatory variable. On the other hand, in FIG. 19, if the nearby equipment that has been acquired is an overhead wire, wind speed and temperature difference are its explanatory variables. If the deterioration prediction calculation has been performed on the overhead wire, which is the different ground equipment, the output value thereof should then be the accumulated value of the product of wind speed and temperature difference, as defined by the function form 1904 in FIG. 19. Thus, if the wind-speed component is excluded from the value of the deterioration prediction calculation that has been obtained, the remaining part represents the amount of contribution by the temperature difference. Then, since the relationship between temperature difference and the degree of deterioration is already known for overhead wire, the temperature difference, or environmental information, that is necessary for predicting the deterioration of the track can be obtained through back calculation. This can be easily understood by replacing the deterioration prediction result using the total load of the environmental load and the transportation load, which is exemplarily shown in FIG. 11, with the total of the environmental deterioration factors. In the example of the process flow in FIG. 20, the prediction calculation can be completed in a subsequent step by using this environmental information to calculate the environmental load on the target equipment.

As described above, according to this embodiment, even if it is impossible to directly acquire the environmental information on deterioration-prediction-calculation-target ground equipment, necessary environmental information can be estimated through back calculation utilizing the degree of deterioration calculated from adjacent different equipment, thereby enabling the deterioration prediction calculation for the desired equipment.

As described above, according to the embodiments of the present invention, the deterioration of maintenance-target railroad ground equipment can be properly predicted with the influence of the installation environment of the equipment and the like taken into account. Also, even if it is impossible to acquire the environmental information on deterioration-prediction-target equipment, necessary environmental information can be estimated from the result of deterioration prediction on nearby different equipment, thereby enabling the deterioration prediction process.

The scope of the present invention is not limited to the above embodiments, and other modifications, applications, and the like are included within the scope of the matters described in the claims.

What is claimed is:

1. A maintenance assistance system for railroad ground equipment, comprising:
   at least one storage device storing thereon a program;
   a communication interface; and
   a processor configured to:
   store environmental information containing information on weather observed at a plurality of geographical points and on geographical conditions at the plurality of geographical points;
   store a first relational formula indicating a relationship between aged deterioration of railroad ground equipment and the environmental information;
   upon receipt of a specification of railroad ground equipment for which to execute deterioration prediction, acquire relevant environmental information which is recorded at a point near an installed position of the specified railroad ground equipment, during a target period of the deterioration prediction;
   predict a first degree of aged deterioration of the railroad ground equipment by using the acquired relevant environmental information and the first relational formula;
   store transportation information containing conditions of travel and amounts of transportation of a train at the plurality of geographical points within line sections of a railroad within which the train is operated;
   store a second relational formula indicating a relationship between aged deterioration of railroad ground equipment and the transportation information;
   upon receipt of the specification of the railroad ground equipment for which to execute the deterioration prediction, acquire relevant transportation information on a line section to which the specified railroad ground equipment belongs, during the target period of the deterioration prediction;
   predict a second degree of aged deterioration of the railroad ground equipment by using the acquired relevant transportation information and the second relational formula;
   add up at least the first and second degrees of aged deterioration of the railroad ground equipment, which are obtained from the relevant environmental information and the relevant transportation information, to obtain a third degree of aged deterioration of the railroad ground equipment;
   calculate an influence of the relevant environmental information and the relevant transportation information on a behavior of the train near the specified railroad ground equipment;
   further predict the third degree of aged deterioration of the railroad ground equipment based on the calculated influence of the relevant environmental information and the relevant transportation information on the behavior of the train near the specified railroad ground equipment; and
   based on the predicted third degree of aged deterioration of the railroad ground equipment, determine when the specified railroad ground equipment is to be replaced,
   wherein the specified railroad ground equipment is to be replaced when the predicted third degree of aged deterioration of the railroad ground equipment exceeds a certain condition-based maintenance reference level.

2. The maintenance assistance system for railroad ground equipment according to claim 1, wherein the processor is further configured to:
   store correspondences between kilometrages in line sections of a railroad and ground absolute positions;
   convert a kilometrage at which the specified railroad ground equipment, for which to execute the deterioration prediction, is installed, into a ground absolute position by referring to the stored correspondences; and
   acquire the relevant environmental information and the relevant transportation information are acquired based on the absolute position obtained by the conversion.

3. The maintenance assistance system for railroad ground equipment according to claim 1, wherein the processor is further configured to:
   store an inspection value and an inspection timing which serve as a reference to determine the first, second and third degrees of aged deterioration of the railroad ground equipment; and calculates another inspection value for determining the first, second and third degrees of aged deterioration as an initial value at a start of a deterioration-prediction-calculation period with the first and second relational formulas from the inspection timing until the start of the deterioration-prediction-calculation period; and calculates the first, second and third degrees of aged deterioration in the deterioration-prediction-calculation period from the calculated initial value.

4. A maintenance assistance method for railroad ground equipment, comprising steps of:

storing environmental information containing information on weather observed at a plurality of geographical points and on geographical conditions at the plurality of geographical points;

storing a first relational formula indicating a relationship between aged deterioration of railroad ground equipment and the environmental information;

upon receipt of a specification of railroad ground equipment for which to execute deterioration prediction, acquiring relevant environmental information which is recorded at a point near an installed position of the specified railroad ground equipment, during a target period of the deterioration prediction;

predicting a first degree of aged deterioration of the railroad ground equipment by using the acquired relevant environmental information and the first relational formula;

storing transportation information containing conditions of travel and amounts of transportation of a train at the plurality of geographical points within line sections of a railroad within which the train is operated;

storing a second relational formula indicating a relationship between aged deterioration of railroad ground equipment and the transportation information;

upon receipt of the specification of the railroad ground equipment for which to execute the deterioration prediction, acquiring relevant the transportation information on a line section to which the specified railroad ground equipment belongs, during the target period of the deterioration prediction;

predicting a second degree of aged deterioration of the railroad ground equipment by using the acquired relevant transportation information and the second relational formula;

adding up at least the first and second degrees of aged deterioration of the railroad ground equipment, which are obtained from the relevant environmental information and the relevant transportation information, to obtain a third degree of aged deterioration of the railroad ground equipment;

calculating an influence of the relevant environmental information and the relevant transportation information on a behavior of the train near the specified railroad ground equipment; and further predicting the third degree of aged deterioration of the railroad ground equipment based on the calculated influence of the relevant environmental information and the relevant transportation information on the behavior of the train near the specified railroad ground equipment; and based on the predicted third degree of aged deterioration of the railroad ground equipment, determining when the specified railroad ground equipment is to be replaced, wherein the specified railroad ground equipment is to be replaced when the predicted third degree of aged deterioration of the railroad ground equipment exceeds a certain condition-based maintenance reference level.

5. The maintenance assistance method for railroad ground equipment according to claim 4, further comprising the steps of:

storing correspondences between kilometrages in line sections of a railroad and ground absolute positions;

converting a kilometrage at which the specified railroad ground equipment, for which to execute the deterioration prediction, is installed, into a ground absolute position by referring to the stored correspondences; and acquiring the relevant environmental information and the relevant transportation information based on the absolute position obtained by the conversion.

6. The maintenance assistance method for railroad ground equipment according to claim 4, further comprising the steps of:

storing an inspection value and an inspection timing which serve as a reference to determine the first, second and third degrees of aged deterioration of the railroad ground equipment; and calculating another inspection value for determining the first, second and third degrees of aged deterioration as an initial value at a start of a deterioration-prediction-calculation period with the first and second relational formulas from the inspection timing until the start of the deterioration-prediction-calculation period; and calculating the first, second and third degrees of aged deterioration in the deterioration-prediction-calculation period from the calculated initial value.

7. A non-transitory computer-readable medium containing a maintenance assistance program for railroad ground equipment, the maintenance assistance program causing a computer including a processor and a memory to:

store environmental information containing information on weather observed at a plurality of geographical points and on geographical conditions at the plurality of geographical points; and store a first relational formula indicating a relationship between aged deterioration of railroad ground equipment and the environmental information;

upon receipt of a specification of railroad ground equipment for which to execute deterioration prediction, acquire relevant environmental information which is recorded at a point near an installed position of the specified railroad ground equipment, during a target period of the deterioration prediction;

predict a first degree of aged deterioration of the railroad ground equipment by using the acquired relevant environmental information and the first relational formula;

store transportation information containing conditions of travel and amounts of transportation of a train at the plurality of geographical points within line sections of a railroad within which the train is operated;

store a second relational formula indicating a relationship between aged deterioration of railroad ground equipment and the transportation information;

upon receipt of a specification of the railroad ground equipment for which to execute the deterioration prediction, acquire relevant transportation information on a line section to which the specified railroad ground equipment belongs, during the target period of the deterioration prediction;

predict a second degree of aged deterioration of the railroad ground equipment by using the acquired relevant transportation information and the second relational formula;

add up at least the first and second degrees of aged deterioration of the railroad ground equipment, which are obtained from the relevant environmental information and the relevant transportation information, to obtain a third degree of aged deterioration of the railroad ground equipment;

calculate an influence of the relevant environmental information and the relevant transportation information on a behavior of the train near the specified railroad ground equipment;

further predict the third degree of aged deterioration of the railroad ground equipment based on the calculated influence of the relevant environmental information and the relevant transportation information on the behavior of the train near the specified railroad ground equipment; and based on the predicted third degree of aged deterioration of the railroad ground equipment, determine when the specified railroad ground equipment is to be replaced, wherein the specified railroad ground equipment is to be replaced when the predicted third degree of aged deterioration of the railroad ground equipment exceeds a certain condition-based maintenance reference level.

8. The non-transitory computer-readable medium according to claim 7, wherein the maintenance assistance program further causes the computer to:

store correspondences between kilometrages in line sections of a railroad and ground absolute positions; and convert a kilometrage at which the specified railroad ground equipment, for which to execute the deterioration prediction, is installed, into a ground absolute position by referring to the stored correspondences; and acquire the relevant environmental information and the relevant transportation information based on the absolute position obtained by the conversion.

9. The non-transitory computer-readable medium according to claim 7, wherein the maintenance assistance program further causes the computer to:

store an inspection value and an inspection timing which serve as a reference to determine the first, second and third degrees of aged deterioration of the railroad ground equipment;

calculate another inspection value for determining the first, second and third degrees of aged deterioration as an initial value at a start of a deterioration-prediction-calculation period with the first and second relational formulas from the inspection timing until the start of the deterioration-prediction-calculation period; and calculate the first, second and third degrees of deterioration in the deterioration-prediction-calculation period from the calculated initial value.

10. The maintenance assistance system for railroad ground equipment according to claim 1, wherein the processor is further configured to:

calculate the influence of the relevant environmental information and the relevant transportation information on the behavior of the train near the specified railroad ground equipment by:

simulating the behavior of the train based near the specified railroad ground equipment based on the relevant environmental information and the relevant transportation information; and estimating the influence of the simulated behavior on the deterioration of the specified railroad ground equipment.

11. The maintenance assistance system for railroad ground equipment according to claim 1, wherein the acquired relevant transportation information includes: an identification of the train; the speed of the train; the acceleration of the train; and information regarding the weight of the train.

12. The maintenance assistance method for railroad ground equipment according to claim 4, further comprising the steps of:

calculating the influence of the relevant environmental information and the relevant transportation information on the behavior of the train near the specified railroad ground equipment by:

simulating the behavior of the train based near the specified railroad ground equipment based on the relevant environmental information and the relevant transportation information; and estimating the influence of the simulated behavior on the deterioration of the specified railroad ground equipment.

13. The maintenance assistance method for railroad ground equipment according to claim 4, wherein the acquired relevant transportation information includes: an identification of the train; the speed of the train; the acceleration of the train; and information regarding the weight of the train.

14. The non-transitory computer-readable medium according to claim 7, wherein the maintenance assistance program further causes the computer to:

calculate the influence of the relevant environmental information and the relevant transportation information on the behavior of the train near the specified railroad ground equipment by:

simulating the behavior of the train based near the specified railroad ground equipment based on the relevant environmental information and the relevant transportation information; and estimating the influence of the simulated behavior on the deterioration of the specified railroad ground equipment.

* * * * *